Nov. 14, 1961   L. R. BLAKE   3,008,418
DYNAMO-ELECTRIC MACHINES

Filed Sept. 12, 1957   3 Sheets-Sheet 1

INVENTOR
LESLIE REGINALD BLAKE
ATTORNEY

INVENTOR
LESLIE REGINALD BLAKE
ATTORNEY

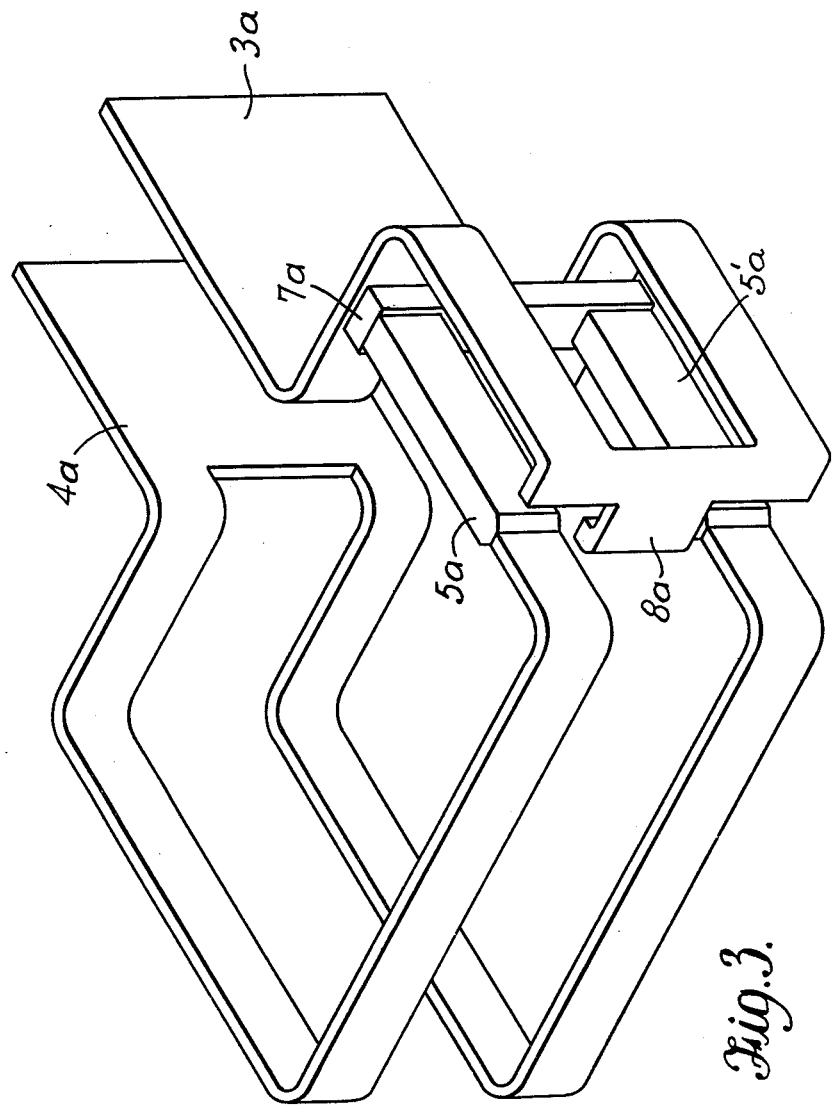

United States Patent Office 3,008,418
Patented Nov. 14, 1961

3,008,418
DYNAMO-ELECTRIC MACHINES
Leslie Reginald Blake, Rugby, England, assignor to The British Thomson-Houston Company Limited, London, England, a British company
Filed Sept. 12, 1957, Ser. No. 683,582
6 Claims. (Cl. 103—1)

This invention relates to electromagnetic pumps for the pumping of electrically conductive liquids, for instance liquid metals, and is more particularly concerned with electromagnetic pumps of the A.C. conduction type. In such pumps, conductive liquid is subjected, in a duct along which it is to be pumped, to a transverse alternating electromagnetic field having the same frequency as an alternating current applied through the liquid in a direction transverse both to the duct and to the magnetic field, the relative phasing of the current and field being such that by their interaction the liquid is propelled along the duct.

It is an object of the present invention to provide a compact A.C. conduction pump in which the current that is applied through the liquid is also employed for producing the magnetic field.

According to the invention, in an electro-magnetic pump of the A.C. conduction type having a magnetic structure defining magnetic poles disposed on opposite sides of a liquid-conveying duct, there is defined, by means of appropriately disposed and connected conductors, a current path which extends for approximately half-a-turn about at least one of the poles, leads into the duct at one of the duct sides other than those opposite the poles, passes externally across the duct from its remaining side, preferably by way of one or more slots in the pole face, and thereafter extends for approximately another half-turn about the pole to complete substantially a full turn.

On applying alternating current through the path so provided, an alternating magnetic flux will be produced across the duct, namely between the poles, since the current path effectively forms a magnetizing winding round the one, or each, pole. Furthermore, the current will pass through the liquid in the duct between the sides of the latter to and from which the path extends, and since the direction of current flow through the liquid is therefore transverse both to the magnetic field and to the length of the duct, it will interact with the magnetic flux to propel the liquid along the duct in accordance with the known principles.

The current applied through the liquid tends to produce an unwanted magnetic flux causing distortion of the main flux in a manner somewhat analogous to armature reaction in a dynamo-electric machine. However, this effect can be at least partially neutralized by arranging the current path to cross the duct by way of a slotted pole face as indicated above.

The current path may conceivably describe several additional turns about the or each pole but preferably only the one effective turn, constituting a single magnetizing winding, is included for the reason that the power factor of the A.C. pump will depend largely on the inductance of the magnetizing winding and it is desirable to keep the power factor as high as possible.

There may be, however, and preferably will be, a number of similar paths for the or each pole, these paths being connected for energization from respective secondary windings on a common supply transformer. The conductors constituting the several paths may extend alongside one another so that the effective windings defined by the paths are generally concentric with the pole and are disposed one within another. It will be appreciated that where there are a number of similar paths as just indicated, the portion of each path constituted by the liquid in the duct will be common to all paths. The current path, or each of them, as the case may be, may be bifurcated so as to pass across the duct on opposite sides thereof and effectively embrace both poles.

In order that the invention may be more clearly understood a particular construction of an A.C. conduction pump conforming to the invention will now the described with reference to the accompanying drawings in which:

FIG. 1a is a sectional plan view showing the lower pole face with the conductors accommodated in slots therein, the upper pole face being similar;

Figure 2:
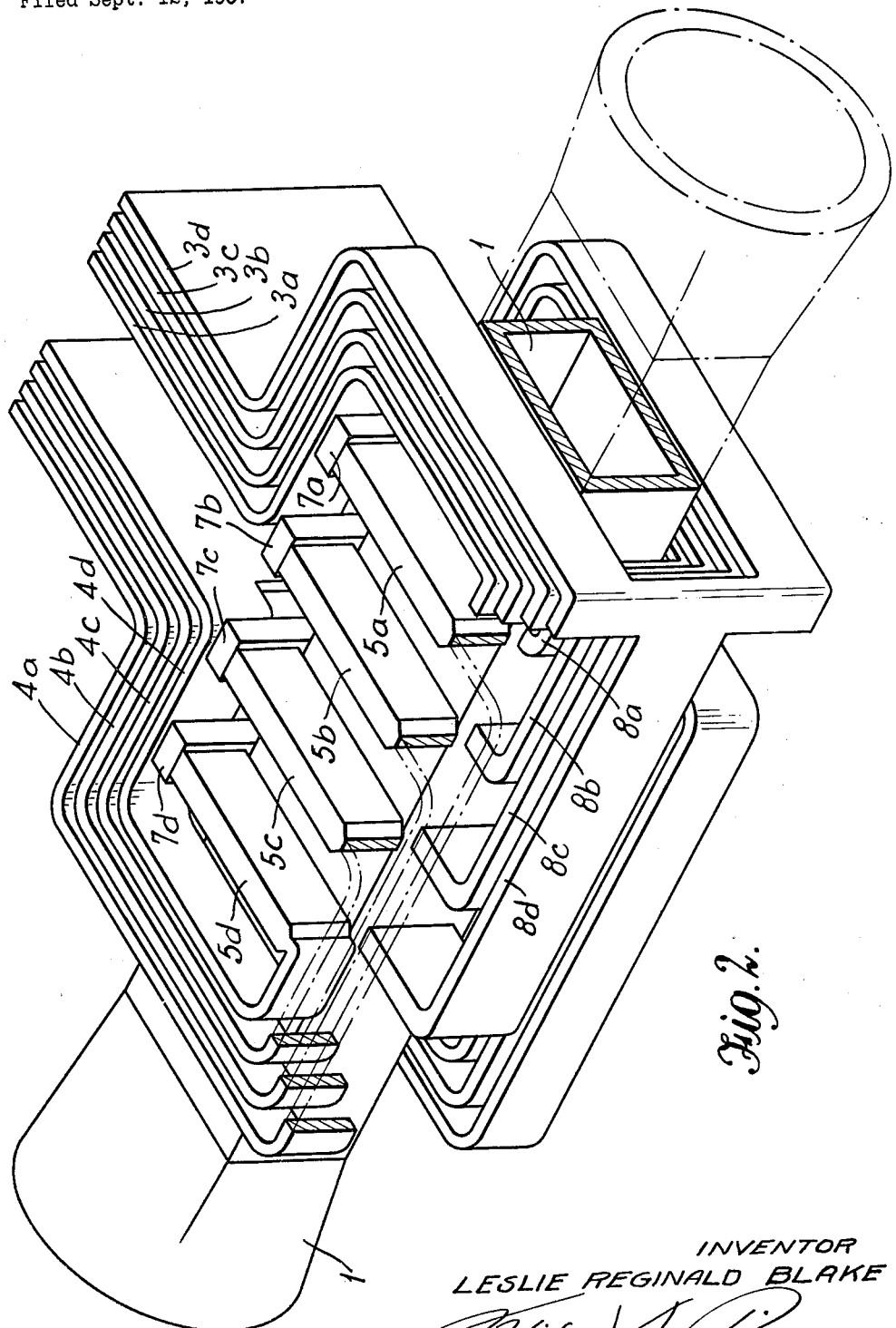

FIG. 2 is a rear isometric view with the magnetic structure omitted in order to show the arrangement of the conductors at the rear of the pump duct, the spacing between the conductors having been exaggerated and parts of certain of the conductors having been indicated only in chain dotted lines in order to reveal the underlying portions; and FIG. 3 shows the arrangement of conductors making up a single turn of effective magnetizing winding.

Referring to the figures, the liquid duct is constituted by a metal tube 1 horizontally disposed between upper and lower magnetic poles 2a and 2b which are disclosed at opposite top and bottom sides of the tube and are defined by a C-shaped magnetic structure 2 made up, for instance, from silicon-iron laminations, the tube 1 having a rectangular section where it lies between the poles. Four heavy-section conductive strip conductors 3a—d, each bifurcated so as to pass above and below the tube 1, are bent to embrace about half the periphery of each of the poles 2a and 2b, these strips being arranged one within the other. At the rear of the tube 1, that is the side facing into the "C" of the magnetic structure 2, the upper and lower sections, such as 3dt, 3db, of each of the strips 3a—d are re-united by a T-shaped electrode part 8a—d by which they are connected to the rear side of the tube 1. A similar number of bifurcated strip conductors 4a—d also passing above and below the tube 1, are bent to embrace approximately the remaining half of the periphery of each of the poles 2a and 2b. At the rear of the tube 1, the upper and lower portions of these latter strips 4a—d are connected to conductors 5a—d and 5'a—d respectively, which cross the tube to its remaining front side by way of respective slots such as 6a—d which are formed in the upper and lower pole faces to accommodate the conductors 5a—d, 5'a—d. The conductors 5a—d are united with the conductors 5'a—d in pairs at the front of the tube 1, and there connected to it, by means of respective electrodes 7a—d. The strips 3a—d and 4a—d are all insulated from each other, as by intervening insulation 9, except where they are connected at the tube 1. The slots such as 6a—d may be defined between non-integral "teeth" provided on the magnetic structure 2, and together defining a pole thereof.

Corresponding strips from the two groups, i.e. strips 3a and 4a, 3b and 4b, etc. are paired and connected to opposite ends of a secondary winding, such as t2, provided individually to each such pair, of a common supply transformer represented symbolically at T. It can be seen therefore that there is defined by the conductors 3, 4, and 5, in conjunction with the electrodes 7 and 8, four current paths, each supplied from its own secondary winding on the transformer, by which current passes half-way round each pole, 2a and 2b, transversely across the tube 1 via the liquid therein (this portion of each path being common), back through the conductors 5a—d in the slots 6a—d in the poles 2a and 2b, and finally halfway round the pole pieces again to complete substantially a full turn. More specifically, one such path extends from one end of the secondary winding t2, through the strip conductor 3d, its bifurcated sections 3dt, 3db, and T-shaped electrode 8d (FIG. 2), across the tube 1 and thence through electrode 7d (FIG. 2) conductor 5d in slot 6d, and strip conductor 4d back to the other side of winding t2. Current flow through these conducting paths will induce vertically through the tube 1 between the pole faces a magnetic field which interacts with the transverse current flow through liquid in the tube to produce a force urging the liquid along the tube 1. The tendency for flux produced by current flow through the liquid to distort the main flux produced between the pole faces is substantially neutralized by an opposing flux produced by the current flow, in opposite direction, through the pole face slots 6a—d.

Figure 1:
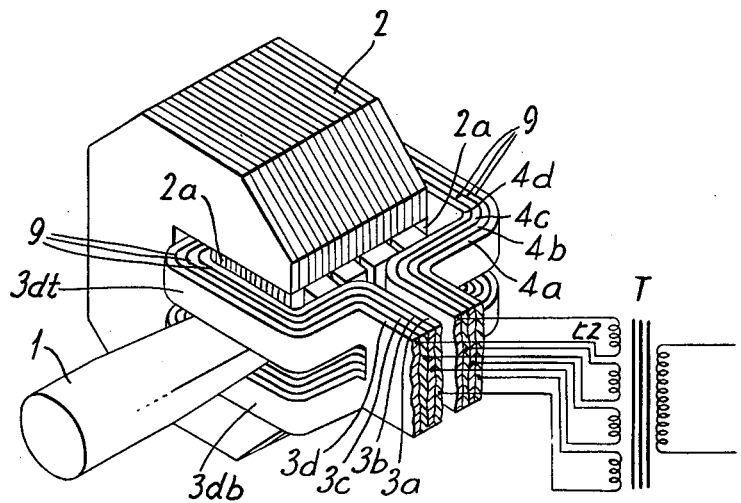
FIG. 1 is a front isometric view of the A.C. conduction pump.
Figure 1A:
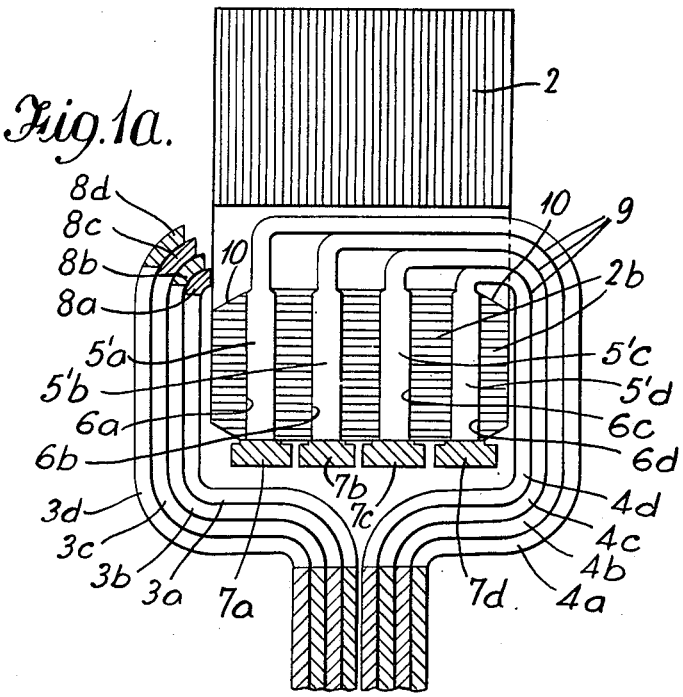

Grading of the magnetic field at the ends of the poles could be effected for instance by appropriately shaping the poles as indicated at 10 in FIG. 1a.

It is preferred to supply the current paths from separate secondary windings of the transformer T in order to reduce eddy current effects by having the conductors constituting the paths connected together only at the faces of the tube duct. These secondary windings would be with advantage interleaved with a multi-section primary winding on the transformer in order to improve the overall power factor.

What I claim is:

1. In combination an electromagnetic pump of the A.C. conduction type including a liquid-conveying duct, a magnetic structure defining magnetic poles disposed on opposite sides of the liquid-conveying duct, a plurality of electric conductors together defining a plurality of parallel current paths, certain of said conductors extending from one of the duct sides other than the sides facing the poles and part way around at least one of the poles to the opposite duct side, being connected to the duct at this opposite side, said paths passing internally across the duct to the starting side through the liquid in the duct, other conductors connected to the duct at said starting side and from there passing externally across the duct back to said opposite side, and finally extending approximately the rest of the way around the pole and returning to the starting side and thereby complete substantially a full turn around the pole means for electrically isolating said conductors from each other except where they are connected to the duct, and a common supply transformer having a plurality of separate secondary windings connected for supplying alternating current to the conductors by which the individual current paths are constituted.

2. A pump as claimed in claim 1 in which each of said conductors is bifurcated to provide two sections which are similarly disposed at said opposite sides of the duct with respect to the duct and to the respective magnet poles.

3. A pump as claimed in claim 2 which includes, for electrically uniting the two sections of each bifurcated conductor, where the conductor is connected to a side of the duct, an electrode extending across that side and connected to it.

4. A pump as claimed in claim 2 in which said two poles have pole face slots by way of which said sections of each of said bifurcated conductors pass externally across the duct at the opposite sides thereof.

5. A pump as claimed in claim 1 in which at least one of said poles has pole face slots by way of which said conductors pass externally across the duct.

6. A pump as claimed in claim 1 designed so that its magnetic structure will provide between the poles thereof a magnetic flux which is graded towards the ends of the poles.

References Cited in the file of this patent

UNITED STATES PATENTS

| 2,258,415 | Lago | Oct. 7, 1941 |
| 2,386,369 | Thompson | Oct. 9, 1945 |
| 2,612,109 | Wakefield | Sept. 30, 1952 |
| 2,702,004 | Blake, et al. | Feb. 15, 1955 |
| 2,715,686 | Asti | Aug. 16, 1955 |
| 2,811,923 | Barnes | Nov. 5, 1957 |

FOREIGN PATENTS

| 699,925 | Great Britain | Nov. 18, 1953 |